United States Patent [19]

Schaver, Jr.

[11] Patent Number: 5,507,098
[45] Date of Patent: Apr. 16, 1996

[54] LEVEL FOR OUTLET BOX COVERS

[76] Inventor: James Schaver, Jr., 5565 W. 95th St. Apt. #2, Oak Lawn, Ill. 60453

[21] Appl. No.: 344,974

[22] Filed: Nov. 25, 1994

[51] Int. Cl.$^6$ .................................................. G01C 9/28
[52] U.S. Cl. .......................... 33/371; 33/347; 33/DIG. 10
[58] Field of Search .............................. 33/370, 371, 372, 33/DIG. 10, 347

[56] References Cited

U.S. PATENT DOCUMENTS

| | | |
|---|---|---|
| D. 298,421 | 11/1988 | Tyroff . |
| 2,813,349 | 11/1957 | Harris . |
| 3,116,563 | 1/1964 | Gelbman .......................... 33/DIG. 10 |
| 3,230,632 | 1/1966 | Redding ................................... 33/372 |
| 3,277,579 | 10/1966 | Murphy .................................... 33/372 |
| 3,279,080 | 10/1966 | Stepshinski ...................... 33/DIG. 10 |
| 3,603,000 | 9/1971 | Ostrager . |
| 4,126,944 | 11/1978 | Burkhart .......................... 33/DIG. 10 |
| 4,888,880 | 12/1989 | Parker ............................... 33/DIG. 10 |
| 5,111,593 | 5/1992 | Gehen, Sr. ........................ 33/DIG. 10 |

*Primary Examiner*—Christopher W. Fulton

[57] ABSTRACT

An electricians tool is disclosed which comprises a body which houses a sliding arm. This arm engages in an electrical outlet box cover to hold the tool under spring pressure in the said cover. A horizontally disposed spirit level and a vertically disposed spirit level are used to align the electrical outlet box cover so that it may be fastened level.

3 Claims, 1 Drawing Sheet

LEVEL FOR OUTLET BOX COVERS

BACKGROUND—FIELD OF INVENTION

This invention relates to the installation of drywall covers on electrical outlet boxes, specifically to a quick and easy, hands free method of leveling outlet covers.

BACKGROUND—DISCUSSION OF PRIOR ART

Many, if not most installers (electricians) of electrical outlet box covers fail to install the covers level because of the time consuming process and clumsiness of the current means available.

Heretofor several methods of leveling the outlet box covers have been proposed and implemented.

One such method requires visually sighting as close to level as possible. This method is only guesswork at its best and can be influenced improperly by many surrounding factors.

Another method of leveling outlet covers involves holding a small spirit level along side the cover. This is clumsy and time consuming, especially since magnetic levels do not adhere to the curved and thin sides of the covers.

U.S. Pat. No. 3,230,632 (Redding) shows a clip on level for construction use which is designed to clip on 2×4 studs or other construction sight material. My device will engage into electrical outlet box covers.

U.S. Pat. No. 5,111,593 (Gehen) shows a tool designed to help facilitate fastening outlet boxes to studs but is not designed to level the boxes or their covers as this invention does.

A final group of U.S. Pat. Nos. 4,126,944 (Burkhart), 3,279,080 (Stephenski), 3,116,563 (Gelbman), and 4,888,880 (Parker) all show the desirability to level switches and recepticals but not the box that they are fastened to.

SUMMARY OF THE INVENTION

Accordingly I claim the following as my objects and advantages of my invention: to provide a tool that will quickly, easily, and precisely level an outlet box cover, whether it be a horizontal receptical cover or a vertical single or double switch cover, to free the users hands to perform the leveling task, to provide a tool that requires minimal skill to use, to provide a tool that is easily transported around a job sight, and to provide a tool that can be constructed of many different materials such as steel or hard plastic so that it can be produced in a manner that is cost effective to the user.

Readers will find further objects and advantages of the invention from a consideration of the ensuing description and accompanying drawings.

DRAWING FIGURES

BRIEF DESCRIPTIONS OF THE DRAWINGS

Figure 1:
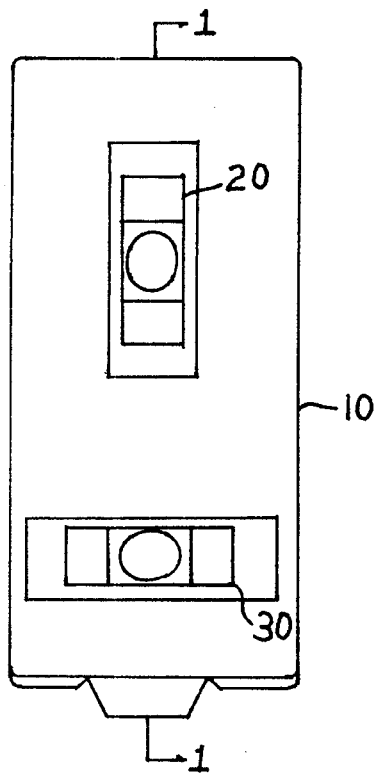
FIG. 1 shows the front of the level with both the bubble levels for horizontal and vertical leveling.
Figure 2:
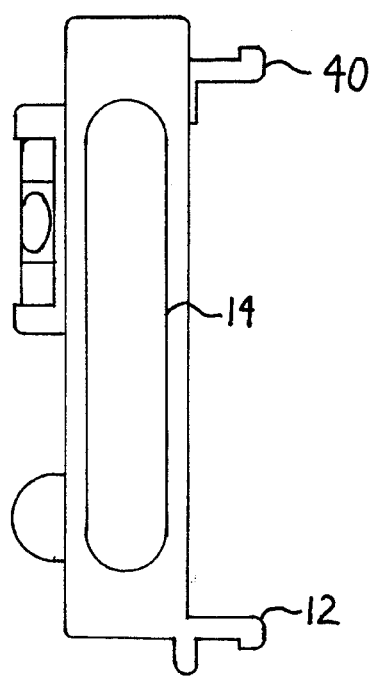
FIG. 2 shows a side view of the tool with the grip indentation and the reach of both the stationary and moving arms.
Figure 3:
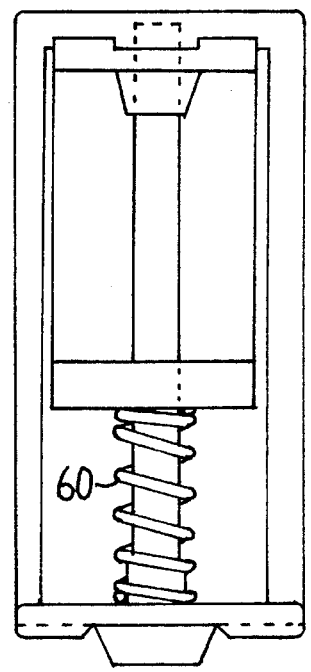
FIG. 3 shows the back of the tool with the spring mechanism and sliding arm and dowel rod it moves along.
Figure 4:
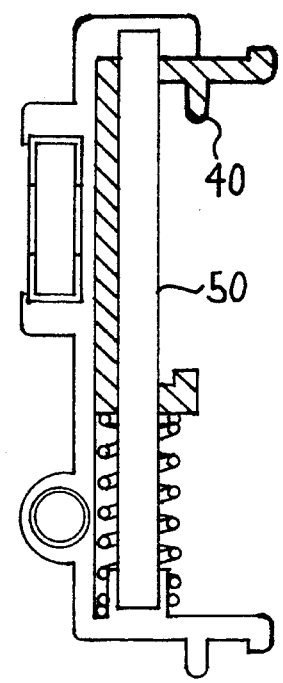
FIG. 4 shows a sectional view of the tool taken along I—I.

FIG. 1 shows the main body of the level which has bubble type levels for leveling. FIG. 2 shows the side view of the tool with the grip indentation and the arms and. FIGS. 3 and 4 show how the sliding arm is held in place so that there is no side movement or forward movement which would render the level useless. Also the location of the spring which causes the pressure on the sliding arm to hold it squarely in position.

DESCRIPTION OF PREFERRED EMBODIMENTS

A body (10) which contains a sliding arm (40) and stationary arm (12) which are spaced enough apart to engage common electrical outlet box covers. This sliding arm (40) is spring-loaded (60).

To operate the tool it is inserted so that the top arms (40) rest against the flat inner surface of the cover. Once contact is made it continues in the same direction until the bottom arms (12) clear the inside of the cover plate. The tool is then moved into the cover plate and the tool is allowed to spring back while engaging the lower arms (12) against the opposite inner surface of the cover plate. The level now holds itself while adjustments and fastening occurs. The tool is then released in the reversed motion.

While the above description contains many specificities, the reader should not construe these as limitations on the scope of the invention, but merely as exemplifications of preferred embodiments thereof. Those skilled in the art will envision other possible variations are within its scope, such as size, shape, and material used.

Accordingly, the scope of the invention should be determined not by the embodiments illustrated, but by the claims and their legal equivalents.

I claim:

1. A device for leveling electrical outlet box covers comprising:
    a body;
    first arm means extending from and rigidly attached to said body for engaging a first surface of an opening in an electrical outlet box cover;
    second arm means extending from and slidably attached to said body for engaging a second surface of said opening;
    spring means interposed between said first and second arm means for biasing said second arm means away from said first arm means, thereby permitting said first and second arm means to securely grip said first and second surfaces of said opening; and
    level means attached to said body for determining a level condition of said cover.

2. The device of claim 1, further including a rod having first and second ends, said first end of said rod being attached to said first arm means, said second end of said rod being attached to said body; said second arm means having an aperture for sliding reception of said rod.

3. The device of claim 2, wherein said spring means is a coil spring, said coil spring surrounding said rod and contacting said first and second arm means.

* * * * *